Aug. 23, 1932.  H. S. REXWORTHY  1,873,032
ROD MILL
Filed April 1, 1930  4 Sheets-Sheet 1

INVENTOR.
HAROLD SIBREE REXWORTHY
BY
ATTORNEY.

Aug. 23, 1932.  H. S. REXWORTHY  1,873,032
ROD MILL
Filed April 1, 1930   4 Sheets-Sheet 2
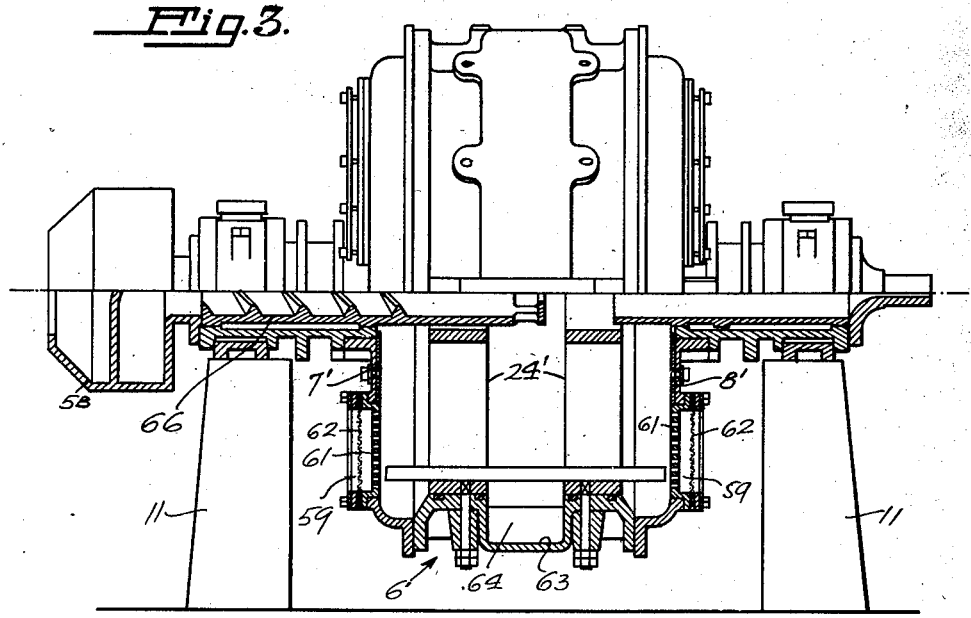
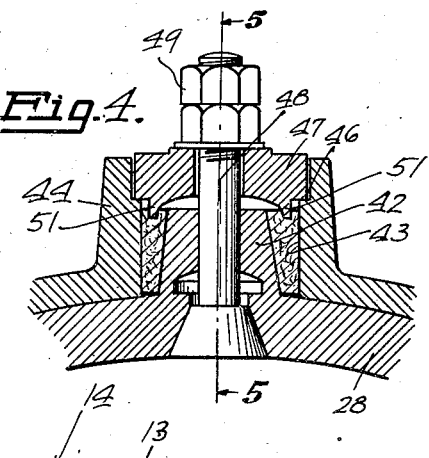
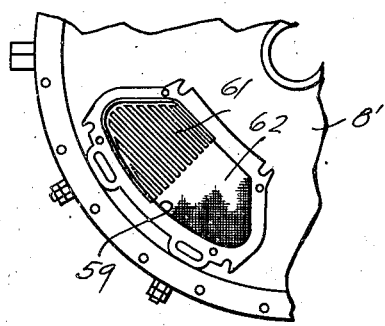
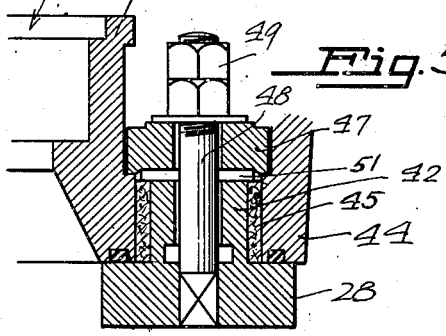
INVENTOR,
HAROLD SIBLEE REXWORTHY
BY
ATTORNEY

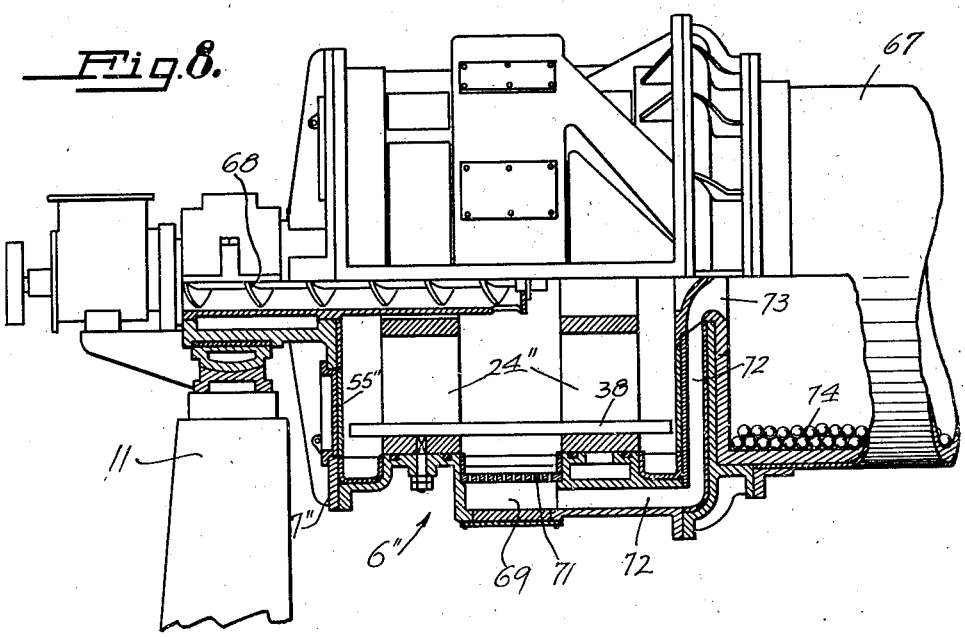

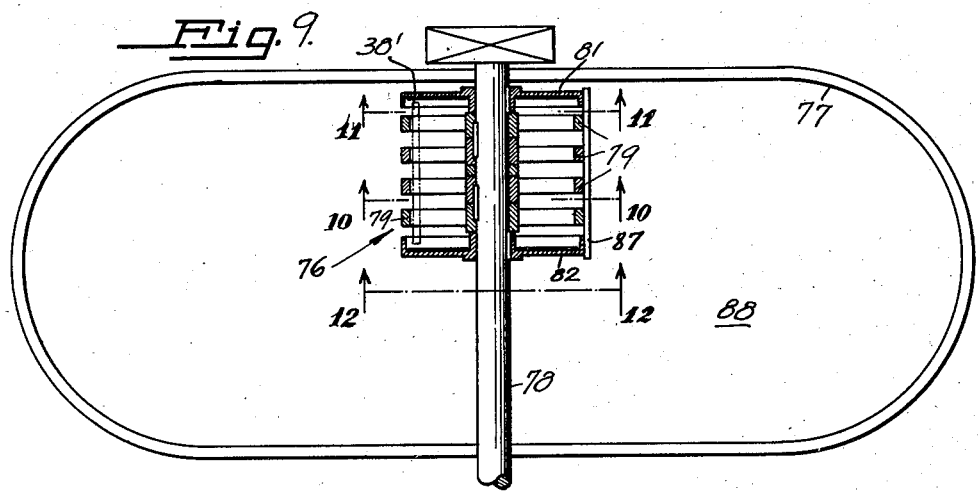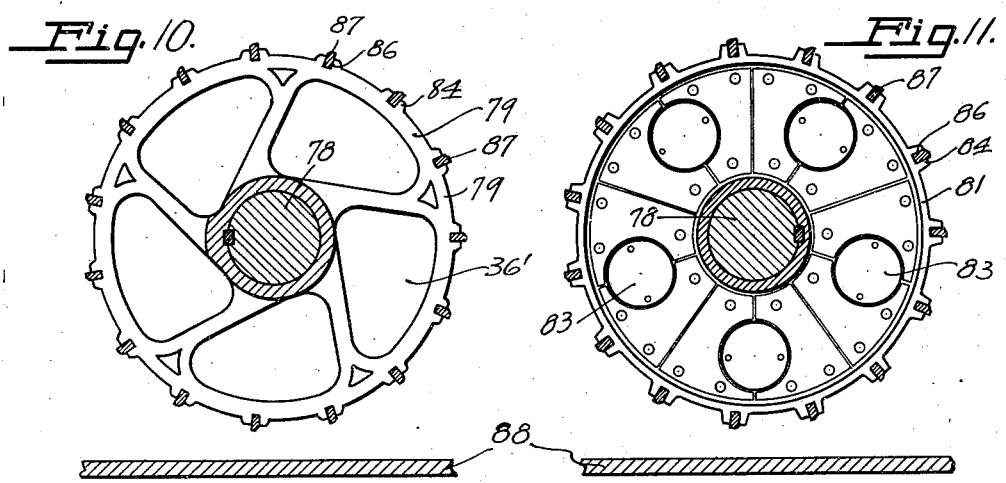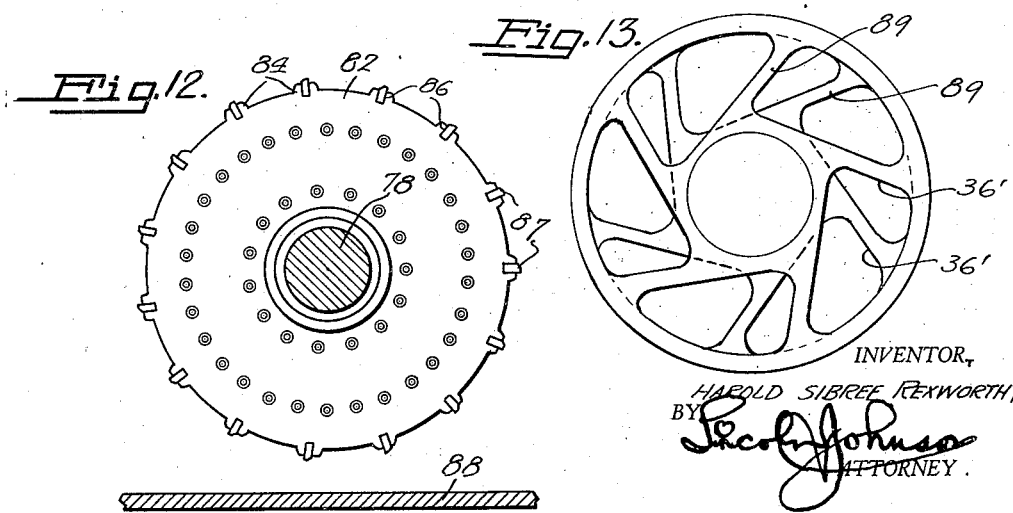

Patented Aug. 23, 1932

1,873,032

UNITED STATES PATENT OFFICE

HAROLD SIBREE REXWORTHY, OF SUNNYVALE, CALIFORNIA, ASSIGNOR TO F. J. BEHNEMAN, OF SAN FRANCISCO, CALIFORNIA

ROD MILL

Application filed April 1, 1930. Serial No. 440,717.

This invention relates to grinding or crushing apparatus.

It is the primary object of the invention to provide a grinding or crushing apparatus in which a plurality of groups of crushing rods or like members are arranged longitudinally around a central rotary member, and are supported in the longitudinally aligned cells or segmental apertures of a plurality of cooperating, spacedly disposed rotary spiders; the shape of the spiders and their disposition relatively to each other being such as to materially increase the efficiency of the apparatus.

Another object of the invention is to provide improved rod supporting spiders for grinding or crushing apparatus of the above type, wherein the openings or cells in the spiders are substantially wedge shaped; the cells being formed by the provision of webs or spokes tangential to the hub or boss of the respective spider so as to define a plurality of annularly disposed, substantially triangular cells or apertures between the hub and the rim of each spider, in which cells the group of rods are loosely confined; means being provided to rotate said spiders in unison, preferably in the direction of the taper of the wedge-like cells, whereby the cascading of the loosely supported rods in the respective cells is utilized for the grinding or crushing of the material fed into the apparatus; the arcs of the inner periphery of the spider rim, between the adjacent webs or spokes form a side, preferably the hypotenuse, of the triangular cells.

Another object of the invention is the provision of a number of pairs of spiders, arranged in longitudinal series, and so disposed that the aligned cells or apertures of one pair of spiders are offset in advance of the aligned apertures of the next, adjacent pair of spiders, each pair of aligned spiders forming a rod supporting unit; by this arrangement the weight of the rods in the apparatus may be equally distributed around the axis of the shaft.

A further object of the invention is the provision of a mill or crushing apparatus in which a plurality of spaced spiders are mounted within a cylinder or shell; a plurality of groups of crushing members being arranged about a centrally disposed feed mechanism, means being provided for rotating the aforesaid elements in unison, whereby the material fed into the shells is crushed by said groups of crushing members; an outlet being arranged circumferentially around the shell intermediate its ends, thru which the crushed material is discharged from the apparatus.

Other objects and advantages are to provide a grinding or crushing apparatus that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings wherein:

Fig. 3 is a side view, partly in section of a modified form of the apparatus.

Fig. 4 is a sectional detail view of a spider mounting structure, the section being taken on the line 4—4 of Fig. 2.

Fig. 5 is a vertical section of the spider mounting, taken on the line 5—5 of Fig. 4.

Fig. 6 is a fragmental view of the modified apparatus showing the end outlet thereof.

Fig. 7 is a fragmental sectional view of the central, peripheral outlet of the apparatus, the section being taken on the line 7—7 of Fig. 1.

Fig. 8 is a side view, partly in section, of a modified arrangement of my apparatus in connection with a ball cement mill.

Fig. 9 is a somewhat diagrammatic plan view of the arrangements of the crushing elements of my apparatus in a pulper tank.

Fig. 10 is a sectional view of the pulper, showing the spider structure thereof, the section being taken on the line 10—10 of Fig 9.

Fig. 11 is another sectional view of the pulper showing an end plate thereof, the section being taken on the line 11—11 of Fig. 9; and Fig. 12 is a sectional view of the pulper, showing the other end plate thru which the crusher rods may be inserted in the pulper, the section being taken on the line 12—12 of Fig. 9; and Fig. 13 is a diagrammatic end view of a spider arrangement, wherein pairs of spiders are arranged in series, in offset relation of their apertures.

Figure 1:
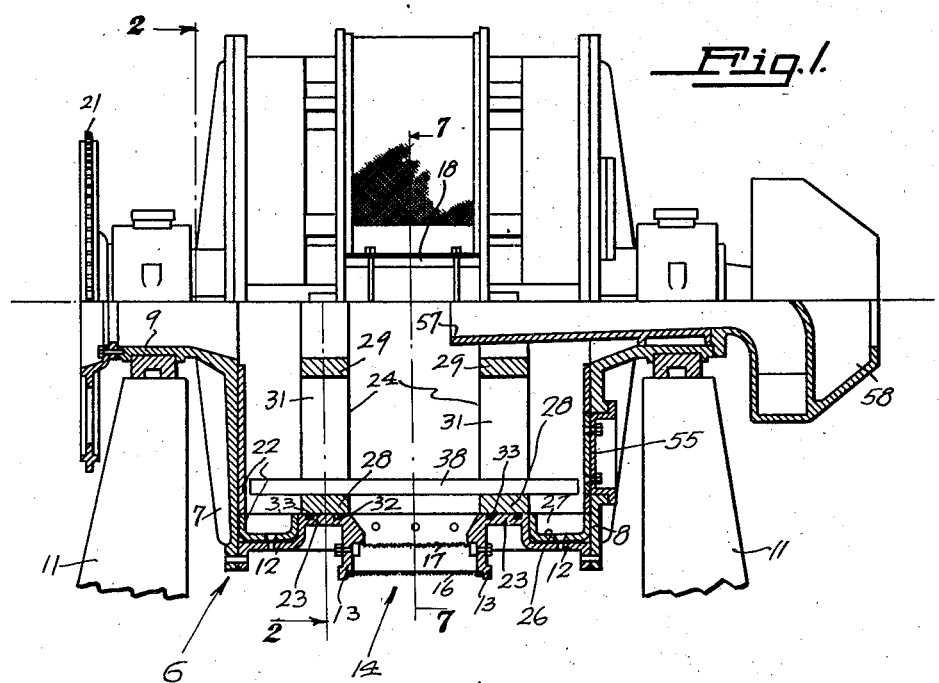
Fig. 1 is a side view, partly in section, of the preferred form of my apparatus.
Figure 2:
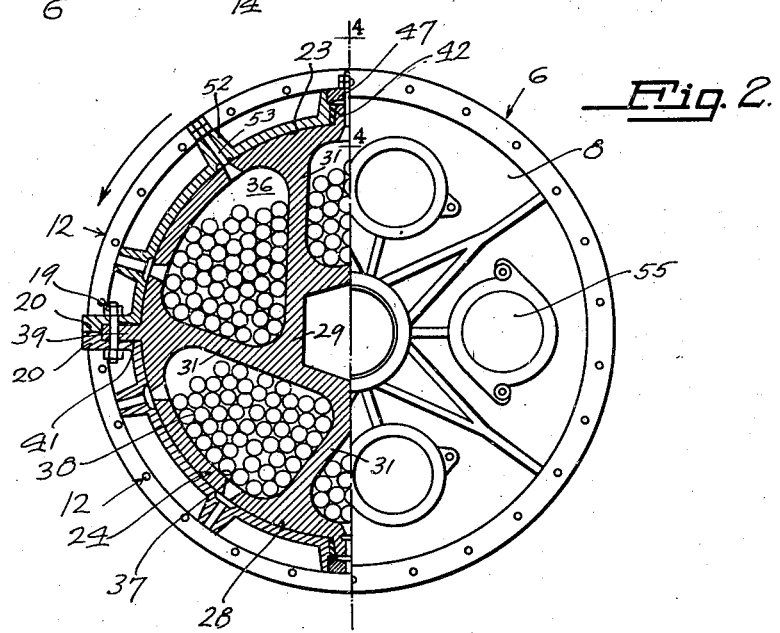
Fig. 2 is a vertical transverse sectional view, taken on the line 2—2 of Fig. 1.

The embodiment of the apparatus illustrated in Figs. 1 and 2 of the drawings, may be used either for wet or dry grinding. In this embodiment a substantially cylindrical shell 6 is provided with end plates 7 and 8. Each end plate has a central tubular boss 9 thereon journaled in a bearing standard 11. A cylindrical drum section 12 is bolted to the inner face of each end plate 7 and 8. The inner ends of the drum sections 12 are spaced from each other and have annular, parallel flanges or discharge lips 13 thereon. Between the flanges 13 is formed a circumferential discharge 14, covered by a cylindrical fine mesh screen 16, and a coarse screen 17, the latter being disposed concentrically within the former. Both screens 16 and 17 are secured to the flanges 13. Each drum section is preferably formed in two halves secured together by bolts 19, thru joining flanges 20, as shown in Fig. 2. Rotation is imparted to the entire shell 14, thru a sprocket 21, on one of the tubular bosses 9. The inner surface of the shell or drum 6 is covered with a suitable resistance lining 22, to protect the shell from excessive wear or injury.

Each drum section 12 is provided with an internal, annular facing 23, adjacent the respective flange or discharge lip 13. These annular facings 23 are of lesser diameter than the inner periphery of the drum sections 12. On the facings 23 are supported spiders 24.

It is to be noted that the internal peripheral recess 26 formed between each facing 23 and the adjacent end plate 7 or 8, has a plurality of blades 27 disposed parallel with the axis of the shell or drum 6, across the respective recess 26, to carry the material to be ground to an uppermost position as the shell 6 is rotated.

Each spider 24 comprises a rim 28, a hub portion 29 and webs or spokes 31. The outer periphery of the rim 28 is supported on the respective facing 23. Each cylindrical facing 23 is provided with one or more circumferential grooves 32 to retain packing rings 33 of rubber or other suitable material therein, whereby substantially air and water tight sealing is provided for the outer peripheries of the spider rims 28.

The hubs 29 of the spiders are hollow, each having a central opening 34 therethru. The webs or spokes 31, which connect the rim 28 to the hub 29, are tangential to the said hub. The adjacent spokes 31 include equal angles, whereby a plurality of annularly disposed, substantially triangular apertures 36 are defined between the rim 28 and the hub 29 of each spider 24. Two sides of the triangular apertures are provided by the adjacent edges of the spokes 31, while the third side of each triangle is an arc 37 of the inner periphery of the spider rim 28, between the said spokes 31.

The apertures or cells 36 are, therefore, substantially wedge shaped, and in some instances the cells are formed in the shape of right angle triangles, the bases of which are substantially tangential to the hub 29, and the hypotenuse of which is formed by an arc of the interrupted inner periphery of the spider rim 28.

The spiders 24 are secured in place within the shell 6 in parallel spaced relation to each other, the corresponding cells 36 being in axial alignment. The pair of spiders 24 form a supporting unit for groups of rods 38, which extend thru the respective aligning cells 36. These groups of rods 38 constitute the crushing members of the machine. It is to be noted that about two-thirds of the area of each cell 36 is filled with rods 38. When the spiders 24 are rotated, preferably in the direction of the wedges of the cells 36, the groups of rods 38 cascade within the cells. The cascading of the groups of rods 38, causes the grinding of the material fed onto the said rods. The arcuate sides 37 of the cells 36 form the anvil surface of the grinder, relative to which anvil surface the rods 38 shift and roll, during the operation of the machine.

In order to prevent the turning of the spiders 24 relatively to the shell 6, diametrically opposite stops 39 are provided on the outer periphery of each spider rim 38, which stops 39 extend into the complemental recesses 41 in the joining flanges 20. The bolts 19 extend thru the respective stops 39 to hold the same securely between the flanges 20.

Another pair of stop lugs 42 extend from the outer periphery of each spider 24, at diametrically opposite points and at right angles to the stops 39. The stop lugs 42 are conical and protrude into the cylindrical apertures 43, in bosses 44 formed on the outside of the respective facings 23. A compressible packing 45 within each aperture 43 seals the spacing between the respective lug 42 and the walls of the aperture 43. The outer end of each aperture 43 is enlarged to form a shoulder 46, against which is pressed a packing gland 47 by means of a bolt 48.

The head of the bolt 48 is disposed within a countersunk recess in the inner periphery of the respective spider 24, while the outer end of the bolt 48 is provided with the usual nuts 49 bearing against the packing gland 47.

It is to be noted that each packing gland 47 has wedges 51 formed on the inner face thereof, which are pressed into the packing 45 to tightly pack the latter against the walls of the aperture 43 and against the periphery of the lug 42. The stops 39 extend from the spiders 24 adjacent the outer ends of the adjacent webs or spokes 39, while the lugs 42 extend opposite the arcuate cell sides 37, allowing the insertion of the bolts 48.

To further secure the spiders 24 to the facings 23, a plurality of bolts 52 are extended thru the spider rims 28 at the cells 36. These bolts 52 are disposed in holes thru the bosses 53 which extend radially from the facings 23. By the use of the stops 39 and 42 and of the bolts 52, the spiders are securely attached to the shell 6 and are positively held against movement relatively to the said shell.

The rods 38 are inserted into the cells 36 thru doors 55, arranged on the end plate 8, in alignment with said cells.

Any suitable driving mechanism may be connected to the sprocket 21 to impart rotary movement to the shell 6. Whenever the shell 6 is rotated, the material therein is carried around thereby and dropped upon the groups of rods 38, then the material passes between the rods 38, into and thru the spider cells 36. The cascading, shifting and rolling of the rods 38, in the cells 36 crushes and grinds the material between the said rods.

The ground and partially ground material is discharged thru the peripheral discharge 14. The outer finer screen 16 is constructed in four or more sections, the ends of each section being clamped into the braces 18 in the manner shown in Fig. 7.

The inner coarse screen 17 is attached to parallel shoulders 54, the latter being formed on the discharge lips or flanges 13. The sections of the coarse screen 17 are shorter than the fine screen 16, so as to leave a free passage 56 at the end of the coarse screen 17. The finely ground material is discharged thru the fine screen 16. But the product that is not ground fine enough cannot pass thru the fine screen 16, and this coarse partially ground material is returned into the shell 6 thru the passages 56 for further grinding. During the rotation of the shell 6, whatever material is not passed thru the fine screen 16 is carried with the rotation of the shell 6 to the top and is dumped thru the passages 56 into the shell 6, and upon the groups of rods 38.

The material to be ground may be fed into the shell 6 by various feed mechanisms. In the illustration in Fig. 1 a tapered feed tube 57 extends thru the end plate 8, and discharges at a point between the spiders 24. The feed tube 57 is held in the boss 9 of the end plate 8 and is rotated by and with the shell 6. On the outer end of the feed tube 57 is arranged the usual feed scoop 58, to scoop the material from a suitable trough or the like, and pass the material into the feed tube 57. The material fed from the larger end of the feed tube 57 drops onto the groups of rods 38 and is carried around in the shell 6 and ground by the crushing members therein. The ground material is then discharged in the manner heretofore set forth.

The modified embodiment of the machine illustrated in Fig. 3, is similar in structure and in operation to the preferred embodiment heretofore described. The modification consists of the provision of end discharges 59 of the shell 6', in place of the central, circumferential discharge 14. A plurality of such end discharges 59 are provided on each end plate 7' and 8'. Each discharge 59 is covered by a scalper screen grid 61. Outside of the grid 61, a finishing screen 62 covers the discharge 59.

In this modified embodiment an annular recess 63 is provided between the spiders 24', in which material, or pulp-lifting vanes 64 hold the material, to lift the same as the shell 6' is rotated. The crushing members of this form operate similarly to those of the preferred embodiment. A feed tube 66 with an internal spiral therein, extends thru the end plate 7', and conveys the material to be crushed, or ground, into the shell 6'.

Fig. 8 illustrates the arrangement of my crushing and grinding rod mill in connection with a ball mill or cement mill 67. In this form a mechanical feed screw 68 conveys the material to be ground into the interior of the shell 6'', between the spiders 24'', wherein an annular recess 69 is formed on the shell 6''. The recess 69 is separated from the interior of the shell 6'' by discharge grids 71 thru which the crushed product is discharged into said recess 69. Right angularly curved passages 72 connect the recess 69 to the center intake 73 of the cylindrical ball mill 67. The discharge flows thru the passages 72 into the ball mill 67 and is finely ground therein by the balls 74, in the usual manner. In this instance the end plate 7'' has the doors 55' thereon for the insertion of the rods 38. The outer end plate 8'' is connected to the end of the ball mill 67. The rod mill and the ball mill 67 are rotated in unison.

Fig. 9 is an illustration of an adaptation of the crushing mechanism for use in a pulper. The crushing mechanism or rod mill beater 76 is installed within a beater tub 77. A shaft 78 extends transversely thru the tub 77 and is connected to a suitable driving mechanism. On the shaft 78 are keyed and fixedly spaced spiders 79. In the illustration two pairs of spiders are shown. At the opposite ends of the set of spiders 79 are fixedly mounted end plates 81 and 82. The end plate 82 has doors 83 thereon thru which the groups of rods 38' may be inserted into the cells 36' of the spiders 79. The spiders 79, in this instance, are not surrounded by a closed shell, so that the pulp may readily circulate therebetween.

The cells 36' of the spiders 79 are wedge shaped, similarly to the cells 36. On the outer periphery of each spider 79 and of the end plate 81 and 82 are a plurality of circumferentially spaced, radially protruding lugs 84. The corresponding lugs 84 on the spiders 79 and on the end plates 81 and 82 are in longitudinal or axial alignment with each other and have slots 86 cut thereinto, to fixedly hold crushing blades 87 therein. The circumferentially spaced, parallel blades 87 extend throughout the entire length of the beater 76. The beater 76 is disposed in comparatively close proximity of the floor 88 of the tub 77, so as to facilitate and improve the action of the blades 87 on the pulp as the beater 76 is rotated. The rotation of the beater 76 causes continuous circulation of the pulp in the tub 77 and thus the pulp is recirculated between the crushing rods 38' and at the blades 87, whereby the material is effectively broken up into small particles.

In all of the embodiments and arrangements of the crusher or grinding mechanism heretofore set forth, the cascading of the groups of rods within the wedge shaped cells of the respective spiders crushes the material introduced into the machine. To further increase the efficiency of the machine the spiders 24 or 79 may be arranged in endwise series, in pairs 89, as in Fig. 13.

The spiders in each pair 89 have the cells 36 thereof in alignment with each other to form a unit to support the respective groups or rods 38. The consecutive pairs 89 have the aligning apertures thereof angularly offset in advance relatively to the next preceding pair 89 of spiders. Thus the groups of crushing rods 38 in the different pairs of spiders do not exert a simultaneous turning moment of the machine as the spiders are rotated. The turning moment of the groups of rods is counteracted by the corresponding groups of rods in the next pair of spiders, and the turning moment due to the rotation of the groups of crushing rods about the common axis is materially reduced.

Having thus described this invention, what I claim and desire to secure by Letters Patent is:

1. A crushing apparatus comprising, a hollow cylindrical shell, having a circumferentially disposed opening midway between the ends thereof; means to support said shell in a rotatable position; means to rotate said shell; spiders rigidly mounted in the shell and having registering apertures therein, each of said apertures being of a substantially triangular cross section and having the bases thereof arranged tangentially to a circle concentric with the axis of the shell and the hypotenuse formed by an arc of the circle forming the inner circumferential surface of the spiders; crushing bars loosely contained in said spider apertures and loosely abutting at either end on the opposite ends of the shell; and means to introduce material to be crushed to said crushing bars midway of their length, said means being arranged in alignment with the axis of rotation of the shell.

2. The combination with a crushing machine, a plurality of groups of crushing rods arranged annularly about a common axis and fixed with respect one to another, the rods in each group being free to move with respect one to another but constantly assembled en masse; means for rotating said groups in unison about said axis; a pair of spaced anvil surfaces with which each group of rods coacts; and means for feeding material to be crushed to said groups midway of their operative length within the operative sphere of said spaced anvils; of a shell, enclosing said anvils and rods and rotatable therewith, having an opening in registery with the space between the anvils through which a portion of the crushed material is discharged.

3. The combination with a crushing machine, a plurality of groups of crushing rods arranged annularly about a common axis and fixed with respect one to another, the rods in each group being free to move with respect one to another but constantly assembled en masse; means for rotating said groups in unison about said axis; a pair of spaced anvil surfaces with which each group of rods coacts; and means for feeding material to be crushed to said groups midway of their operative length within the operative sphere of said spaced anvils; of a shell, enclosing said anvils and rods rotatable therewith, having an opening in registry with the space between the anvils through which a portion of the crushed material is discharged; and pockets in said shell surrounding said groups of crushing rods adjacent their opposite ends for receiving a portion of the crushed material for elevating the same and depositing it onto the rods.

4. The combination with a crushing apparatus comprising a cylindrical shell closed at its opposite ends; a horizontally disposed rotatably mounted tubular supporting shaft extended axially into the shell, said shaft being provided with a material inlet outside of the shell and a material discharge outlet inside of the shell and an outlet on the shell for the ground material, and means for rotating the shell; of a pair of spiders secured to the shell on opposite sides of the material discharge outlet, each spider consisting of a ring having spokes extended tangentially to a hub concentric with the ring whereby the angles included between adjacent spokes are equal, to define a plurality of annularly disposed substantially triangular apertures; groups of rods loosely confined between the ends of the shell in registering apertures in the pair of spiders, said rods being movable in the area defined by each aperture.

5. The combination with a crushing apparatus comprising a cylindrical shell closed at its opposite ends; a horizontally disposed rotatably mounted tubular supporting shaft extended axially into the shell, said shaft being provided with a material inlet outside of the shell and a material discharge outlet inside of the shell, and means for rotating the shell; of a pair of spiders arranged on opposite sides of the material discharge outlet within the shell, each spider consisting of a ring having spokes extended tangentially to a hub concentric with the ring whereby the angles included between adjacent spokes are equal, to define a plurality of annularly disposed substantially triangular apertures; groups of rods loosely confined between the ends of the shell in registering apertures in the pair of spiders, said rods being movable in the area defined by each aperture; and a material discharge outlet arranged circumferentially around the shell, between the spiders.

6. The combination with a crushing apparatus comprising a cylindrical shell closed at its opposite ends; a horizontally disposed rotatably mounted tubular supporting shaft extended axially into the shell, said shaft being provided with a material inlet outside of the shell and a material discharge outlet inside of the shell, and a discharge on the shell for the crushed material; and means to rotate the shell; of a pair of spiders arranged on opposite sides of the first material discharge outlet within the shell, each spider consisting of a ring having spokes extended tengentially to a hub concentric with the ring whereby the angles included between adjacent spokes are equal, to define a plurality of annularly disposed substantially triangular apertures; groups of rods loosely confined between the ends of the shell in registering apertures in the pair of spiders, said rods being movable in the area defined by each aperture; and an annular series of pockets in the shell surrounding said groups of rods adjacent their opposite ends and rotatable therewith for receiving a portion of the crushed material for elevating the same and depositing it onto said rods.

7. A crushing apparatus comprising a cylindrical shell closed at its opposite ends; a horizontally disposed rotatably mounted tubular supporting shaft extended axially into the shell, said shaft being provided with a material inlet outside of the shell and a material discharge outlet inside of the shell; a pair of spiders arranged on opposite sides of the material discharge outlet within the shell, each spider consisting of a ring having spokes extended tangentially to a hub concentric with the ring whereby the angles included between adjacent spokes are equal, to define a plurality of annularly disposed substantially triangular apertures; groups of rods loosely confined between the ends of the shell in registering apertures in the pair of spiders, said rods being movable in the area defined by each aperture; a material discharge outlet arranged circumferentially around the shell, between the spiders; an annular series of pockets in the shell surrounding said groups of rods adjacent their opposite ends and rotatable therewith for receiving a portion of the crushed material for elevating the same and depositing it onto said rods; and means for rotating the shell, spiders, rods and shaft.

8. A crushing apparatus comprising a cylindrical shell closed at its opposite ends; a horizontally disposed rotatably mounted tubular supporting shaft extended axially into the shell, said shaft being provided with a material inlet outside of the shell and a material discharge outlet inside of the shell; a pair of spiders arranged on opposite sides of the material discharge outlet within the shell, each spider consisting of a ring having spokes extended tangentially to a hub concentric with the ring whereby the angles included between adjacent spokes are equal, to define a plurality of annularly disposed substantially triangular apertures; packing rings interposed between the ends of the shell in registering apertures in the pair of spiders, said rods being movable in the area defined by each aperture; a material discharge outlet in the shell; and means for rotating the shell, spiders, rods and shaft.

9. A crushing apparatus comprising a cylindrical shell closed at its opposite ends; a horizontally disposed, rotatably mounted tubular supporting shaft extended axially into the shell, said shaft being provided with a material inlet outside of the shell and a material discharge outlet inside of the shell; a pair of spiders arranged on opposite sides of the material discharge outlet within the shell, each spider consisting of a ring having spokes extended tangentially to a hub concentric with the ring whereby the angles included between adjacent spokes are equal, to define a plurality of annularly disposed substantially triangular apertures; groups of rods loosely confined between the ends of the shell in registering apertures in the pair of spiders, said rods being movable in the area defined by each aperture; a material discharge outlet in the shell; means for rotating the shell, spiders, rods and shaft; a casing in concentric alignment with said shell and movable therewith; and a conduit communicating the discharge outlet on the shell with the casing through which crushed material from the shell is passed to the casing.

10. In a crushing apparatus, a plurality of spiders mounted to rotate together, each spider consisting of a ring having spokes extended tangentially to a hub concentric with the ring whereby the angles included between adjacent spokes are equal, to define a plurality of annularly disposed substantially triangular apertures; groups of rods loosely confined in registering apertures in the plurality of spiders; and means to rotate said spiders and rods.

11. In a grinding or crushing apparatus of the character described, a plurality of spiders, each formed with cells substantially wedge-shaped in the form of triangles, a side of each of which is substantially tangential to a central circle, and the hypotenuse of each of which is formed by an arc of the interrupted circle forming the inner surface of the peripheral rim of the spider, the apertures being in registry with each other, and groups of crushing rods loosely confined in the respective registering cells.

12. In a grinding or crushing apparatus of the character described, a plurality of spiders, each formed with cells substantially wedge-shaped in the form of triangles, a side of each of which is substantially tangential to a central circle, and the hypotenuse of each of which is formed by an arc of the interrupted circle forming the inner surface of the peripheral rim of the spider, the apertures being in registry with each other, groups of crushing rods loosely confined in the respective registering cells, and longitudinally disposed crushing blades interconnecting the spiders to supplement the action of the rods.

In testimony whereof, I have hereunto set my hand at San Francisco, California, this 4th day of January, 1930.

HAROLD SIBREE REXWORTHY.